United States Patent [19]

Billings et al.

[11] Patent Number: 4,797,541

[45] Date of Patent: Jan. 10, 1989

[54] POWER REGULATOR FOR A CONTACTLESS CREDIT CARD SYSTEM

[75] Inventors: Robert L. Billings, Andover, Mass.; Mark A. Bowers, Woodburn; Frankie G. Meier, Indianapolis, both of Ind.

[73] Assignee: American Telephone and Telegraph Company—AT&T Information Systems, Holmdel, N.J.

[21] Appl. No.: 851,849

[22] Filed: Apr. 14, 1986

[51] Int. Cl.$^4$ .................... G06K 7/08; G06K 19/06
[52] U.S. Cl. ................................ 235/449; 235/492; 235/493; 363/97; 363/26; 323/901; 364/483
[58] Field of Search ............... 235/380, 492, 493, 441, 235/439, 449, 483, 488; 364/483, 492; 365/226; 336/115, DIG. 2; 323/901, 355, 301, 234, 238, 241, 242, 247, 259, 264; 363/19-21, 50, 82, 24-26, 97; 361/7, 35, 36, 78, 79

[56] References Cited

U.S. PATENT DOCUMENTS

| | | | |
|---|---|---|---|
| 4,032,830 | 6/1977 | Buonavita | 363/25 |
| 4,277,837 | 7/1981 | Stuckert | 235/380 |
| 4,463,353 | 7/1984 | Kuzara | 340/825.54 |
| 4,480,178 | 10/1984 | Miller et al. | 235/380 |
| 4,578,758 | 3/1986 | Muller | 364/483 |
| 4,605,844 | 8/1986 | Haggan | 235/492 |
| 4,650,981 | 3/1987 | Foletta | 235/492 |
| 4,674,618 | 6/1987 | Eglise et al. | 235/487 |
| 4,675,516 | 6/1987 | Guion | 235/441 |
| 4,692,604 | 9/1987 | Billings | 235/493 |

FOREIGN PATENT DOCUMENTS 0016537 10/1980 European Pat. Off. .
2148075 5/1985 United Kingdom .

OTHER PUBLICATIONS

IEEE Transactions on Biomedical Engineering, vol. BME-27, No. 8, 8/80, W. H. Ko et al., "RF-Powered Cage System ... " pp. 460-467.
"Smart Credit Cards: The Answer to Cashless Shopping", *IEEE Spectrum*, S. B. Weinstein, 2/84, pp. 43-49.
"Smart Cards" *Scientific American*, R. McIvor, 11/85, pp. 152-159.

*Primary Examiner*—Raymond F. Cardillo
*Assistant Examiner*—Robert A. Weinhardt
*Attorney, Agent, or Firm*—Michael A. Morra

[57] ABSTRACT

A power transfer arrangment provides regulated power transfer from a station to a contactless portable data card without the need for regulation circuitry on the card itself. The station includes a primary coil for magnetically coupling power to a secondary coil, located on the card, when the data card is brought into close association with the station. The arrangement includes a microprocessor, a power amplifier including the primary coil, a variable voltage source and apparatus for measuring current flow in the primary coil. When the portable data card is not in close association with the station, the microprocessor causes the variable voltage source to provide a sequence of stepped voltages. Quiescent current flow is measured at each step and stored in memory. When the portable data card is brought into close association with the station, the microprocessor causes the variable voltage source to provide a sequence of stepped voltages. Active current flow is measured at each step and stored in memory. Power delivered to the data card is calculated as the difference between active and quiescent currents—multiplied by the magnitude of the variable voltage source. The sequence of active current measurements continues until the calculated value of power delivered to the data card exceeds a predetermined threshold power, at which time the data card is receiving a precise, predetermined amount of power.

12 Claims, 4 Drawing Sheets

POWER REGULATOR FOR A CONTACTLESS CREDIT CARD SYSTEM

FIELD OF THE INVENTION

This invention relates to equipment that communicates with electronic transaction cards. More particularly, it relates to apparatus for delivering a predetermined amount of power to such a card through a contactless interface.

BACKGROUND OF THE INVENTION

Personal Data Cards (PDC), also known as "Smart Cards," are devices that include one or more microelectronic chips embedded in a piece of plastic about the size of a conventional credit card. Typically, the chips include a microprocessor to perform computing operations and some form of memory, such as an EEPROM, for storage. Such cards may be used, for example, in a manner similar to a "debit" card for long distance telephone calls, retail store purchases and automatic banking machines. Other uses include personal identification and general data storage which may be modified from time to time by the card holder or the card issuer. Background material for such cards can be found in an article entitled "Smart Credit Cards: the answer to cashless shopping" published in the February, 1984 issue of *IEEE Spectrum* at pages 43–49; and in an article entitled "Smart Cards" published in the November, 1985 issue of *Scientific American* at pages 152–159.

Power transfer to the PDC is conventionally achieved via metallic contacts which, unfortunately, are subject to oxidation, corrosion, and the deposit of surface contaminants that may increase ohmic resistance in one situation, or create a short circuit between adjacent contacts in another. Such metallic contacts need to be electrically and mechanically rugged to provide reliable results over their expected lifetime.

One solution to this general problem is disclosed in U.S. Pat. No. 4,480,178 issued Oct. 30, 1984 to R. R. Miller II, et al for a "Tuning Arrangement for Interfacing Credit Card-Like Device to a Reader System," assigned to the assignee hereof and incorporated herein by reference. The reference discloses an arrangement that provides operating power to the PDC through a capacitive interface. A variable inductor automatically tunes a power transfer circuit to resonance and thereby maximizes power transfer to the card. Unfortunately, the size of the capacitor plates limits the amount of power that can be transferred to the card.

An improved technique for transferring power to the PDC is disclosed in U.S. Pat. No. 4,692,604 issued Sept. 8, 1987 to Billings for a "Flexible Inductor," assigned to the assignee hereof and incorporated herein by reference. This application discloses a card having a flexible coil and a flexible ferromagnetic member which, when inserted into an associated card reader/writer unit, inductively couples to a transformer primary so that the coil in the PDC operates as a transformer secondary and, in that role, receives electrical power from the reader/writer unit. No provision, however, is made in such an arrangement to regulate the amount of power that is delivered to the card. The proper positioning of the PDC in the reader/writer unit is of some significance in this regard; equipment tolerances and variation in air gaps among different PDCs may cause too little or too much power to be transferred to the card. Too little power would not activate the circuitry while too much power would damage it. Another general concern is the need to determine whether a conventional credit card or a PDC is being inserted into the reader/writer unit without requiring the card holder to enter such information.

Accordingly, it is an object of the present invention to provide a card reader/writer unit with the ability to distinguish the type of card (conventional or PDC) that is inserted therein.

It is another object of the invention to transfer a predetermined amount of power to a PDC, inserted into a card reader/writer unit, regardless of card warpage or improper alignment between the card and the unit.

SUMMARY OF THE INVENTION

A power transfer arrangement is disclosed for magnetically coupling a predetermined amount of electrical power to a load impedance contained on a Personal Data Card (PDC). A power amplifier, driven by an oscillator, includes a variable voltage source and a first coil that operates as a transformer primary - the transformer secondary being another coil located on the PDC. The arrangement is characterized by apparatus for measuring the magnitude of current flow through the first coil and the magnitude of the variable voltage source. The product of these magnitudes forms a measure of generated power. Apparatus is provided for storing the measured power and for detecting the presence or absence of a card so that power might be measured both with and without the load impedance present. Apparatus is also provided for calculating the difference between the power with and without the load impedance present, and for varying the magnitude of the variable voltage source until the power difference is substantially equal to the predetermined amount of electrical power.

It is a feature of the present invention that regulated power may be supplied to a PDC with minimum power dissipation on the PDC itself.

It is another feature of the present invention that the oscillator used in connection with power transfer also provides timing to the PDC.

BRIEF DESCRIPTION OF THE DRAWING

The invention and its mode of operation will be more readily understood from the following detailed description when considered in connection with the accompanying drawings in which.

DETAILED DESCRIPTION

Figure 1:
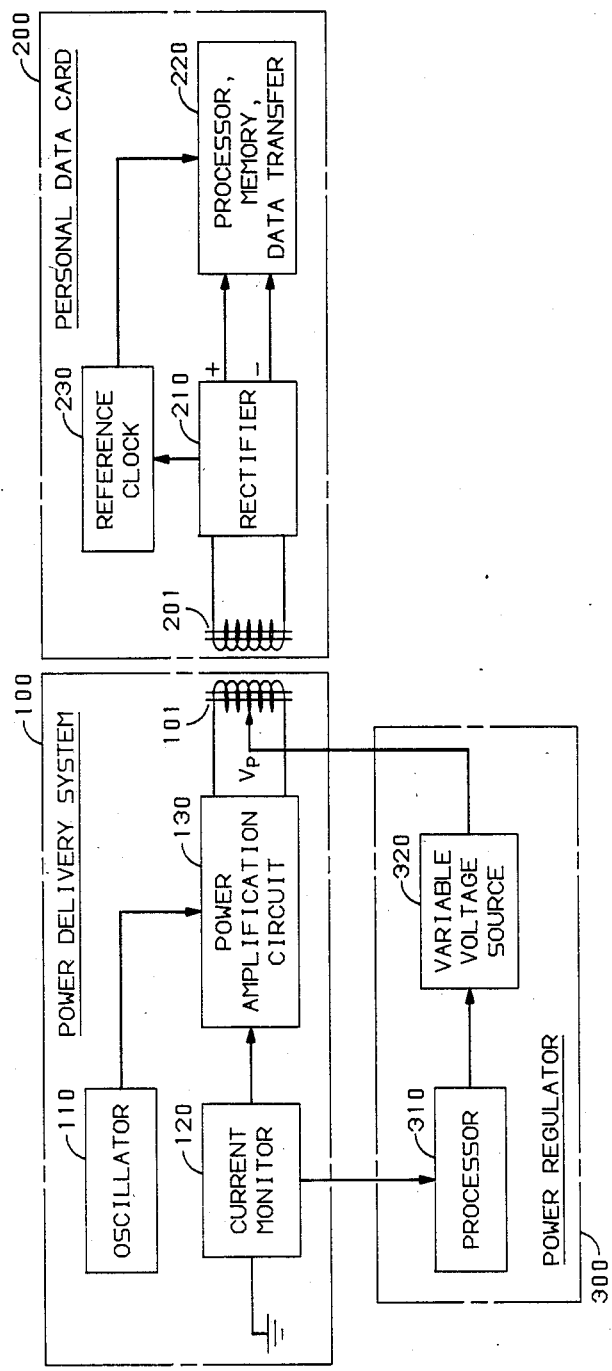
FIG. 1 illustrates, in block diagram form, a regulated power delivery system for a contactless data card in accordance with the invention.

FIG. 1 generally illustrates, in block diagram form, a power delivery system for an electronic transaction card, also referred to as a Personal Data Card (PDC). PDC 200 is intended to be inserted into a card reader/writer unit (receptor) designed to transfer data to and receive data from the PDC by way of electrical signals. PDC 200 is similar in appearance to a conventional credit card in that it is made from an opaque plastic material and is of approximately the same dimensions (85.7×54×0.76 mm). PDC 200 further includes the full power of a microprocessor and associated memory—integrated circuits that are embedded within the plastic of the card and require power in order to operate. Although a number of techniques exist for providing power to such circuits, the present invention discloses an apparatus and method for delivering only a predetermined amount across a contactless interface. FIG. 1 focuses on the power transfer from the reader/writer unit to the PDC. Aspects such as data transfer between the PDC and the reader/writer unit are not discussed herein.

PDC 200 includes a number of circuits that require power in order to operate and are collectively represented by block 220. Inductive device 201 includes a flexible coil and a flexible core piece. This inductive device forms a secondary coil of a transformer which cooperates with primary coil 101 located in power delivery system 100 of the reader/writer unit. Rectifier 210 operates to convert AC voltage into DC voltage; such rectifiers are well known among those skilled in the art. Reference clock 230 extracts timing from the AC voltage delivered to inductive device 201 and generates a clock signal for use by the circuits designated 220.

The portion of the reader/writer unit that operates to power the PDC comprises power delivery system 100 and power regulator 300. Power amplification circuit 130 is driven by oscillator 110 and in turn drives primary coil 101. Voltage is supplied to primary coil 101 in a center tapped arrangement fed from variable voltage source 320. Current monitor 120 measures the DC current drive that flows through primary coil 101. Processor 310, among other things, controls the primary voltage level, $V_p$, applied to the center tap of primary coil 101 and stores in its memory the DC current drive measured by current monitor 120.

Before PDC 200 is inserted into the reader/writer unit, processor 310 causes variable voltage source 320 to apply a sequence of stepped voltage levels to primary coil 101 and store in its memory the measure of a quiescent DC current drive associated with each of the stepped voltage levels. After PDC 200 is inserted into the reader/writer module, processor 310 causes variable voltage source 320 to increase the voltage applied to primary coil 101 in a similar sequence of stepped voltage levels. Thereafter, current monitor 120 measures the DC current drive through primary coil 101 and presents that measurement, in digital form, to processor 310 where it is stored in association with the particular primary voltage that caused it to flow. A measure of power is then calculated from the product of these currents and voltages. For each of the stepped voltages a power difference is also calculated between the measured power with and without the PDC inserted. This power difference corresponds to the amount of power actually delivered to the PDC. When this amount exceeds a predetermined threshold the stepping process is discontinued, and the voltage presently being applied to primary coil 101 is fixed until the PDC is removed from the reader/writer unit. After removal of the PDC, new quiescent values of power are calculated.

Figure 2:
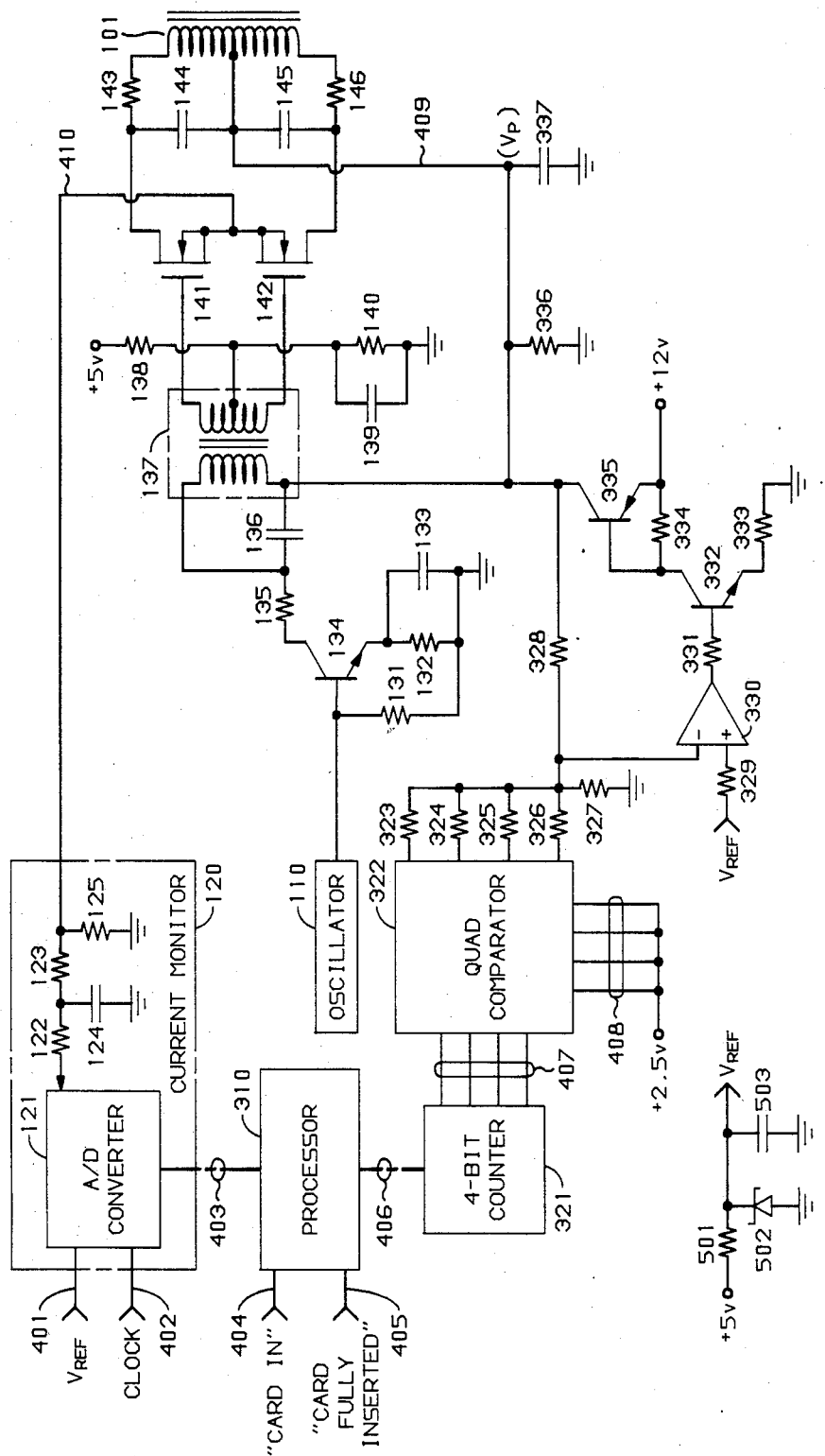
FIG. 2 discloses schematic details of the regulated power delivery system generally illustrated in FIG. 1.

Referring now to FIG. 2, oscillator 110 supplies a 1.8432 MHz square wave to transformer 137 through a preamplifier comprising components 131–136. In the preamplifier, resistor 132 provides bias stabilization and sets the emitter current while capacitor 133 is an associated AC bypass. The preamplifier's square wave output is converted into a sine wave by the primary of interstage transformer 137 which is resonated by the input capacitance of the drive FETs, reflected back to transformer 137, and capacitor 136 in parallel with the transformer primary. Resistor 135 provides a fixed output impedance that prevents shorting of the tank circuit (from an AC standpoint) when transistor 134 is on. Transformer 137 is designed to step up the voltage by a factor of four and it is center tapped to split the output into two signals—180 degrees apart.

The drive circuit of the power amplifier consists of two FETs, 141–142, arranged as a push-pull, class B amplifier. Tuning capacitors 144, 145 and resistors 143, 146 and 123 are used for wave shaping. The push-pull configuration is used to obtain a larger peak-to-peak output swing from the fixed supply than would be possible with a single device amplifier. Theoretically, a peak-to-peak swing of four times the supply voltage can be obtained when the output coil is resonated. Obtaining this output swing is important because it allows the primary to have more turns for the same voltage output at the secondary. This in turn lowers circuit Q, and consequently circuit losses. The peak swing on each FET gate can be as high as 18 volts in the present circuit. This swing is intentionally made high to insure that all devices will turn on hard, thus reducing the variation of "on" channel resistance that might be encountered over various devices if a low drive level is used.

FETs 141, 142 have a $V_t$ of 2 to 4 volts, and an "on" channel resistance of 2.4 ohms max. The gate drives are provided by a center tapped transformer output, from the predrive, with the center tap DC biased at 1.8 volts nominally to reduce deadband during transition intervals. A voltage divider comprising resistors 138, 140 along with filter capacitor 139 provides the necessary bias.

Capacitors 144, 145 are used to resonate the primary coil 101. Without definite tuning, the primary would be excited at its self-resonant frequency and produce severe ringing which would create the possibility of false clock pulses appearing on the secondary. Tuning also makes the primary circuit look like a "real" load to the drive circuit, thus greatly reducing reactive current components in the drive and the associated losses. The tuning capacitance is split between capacitors 144–145, each having double the required value of capacitance and placed in series across the primary halves. This provides a smoother and more symmetrical output waveform than a single capacitor placed across the entire primary coil 101.

It is important to acquire a measure of the drive current flowing though coil 101 so that an estimate of power consumption can be made. Since all current that passes through the coil also passes through resistor 125 located in current monitor 120, the DC voltage across resistor 125 is proportional to the drive current. Resistor 125 serves as the drive current sensing resistor as well as a source degeneration resistor for drive FETs 141, 142. The voltage across resistor 125 is filtered by resistors 122, 123 and capacitor 124. Analog to Digital (A/D) converter 121 is a device used to convert an analog voltage, present at its input, into an ordered sequence of 8 binary voltages at its output. The analog voltage referred to is, of course, the voltage across resistor 125 after filtering. A clock signal of 153.6 kHz is applied to input 402 of A/D converter 121 enabling it, in conjunction with the reference voltage on input 401, to step through a series of successive approximations. Processor 310 initiates the conversion process over leads designated 403. A/D converter 121 presents its output data to processor 310 as a serial bit stream over leads 403 with the Most Significant Bit (MSB) presented first. A/D converter 121 is a conventional 8-bit serial converter such as the ADC 0831 available from Texas Instruments.

Processor 310 is an 8-bit microcontroller, such as the Intel 8051, that controls A/D converter 121 and power regulator 300 to determine if an inserted card is a PDC, and to set the power transferred to the PDC to the proper level. Optical detectors are used to sense when a card is present and whether it is fully inserted into the reader/writer unit. These sensor circuits are identical, and use a slotted optical switch with mechanically activated interrupters. The aperture dimensions of the optical switch (MST9230), used in the preferred embodiment of the invention, are 20 mils wide by 60 mils high. The mechanical design insures that the aperture is either completely blocked or completely opened when a card is inserted or withdrawn, respectively. Each time a card is withdrawn from the card slot (denoted by the return of the "card in" sensor to a high state) processor 310 enables counter 320 and sends a sequence of 15 pulses to the counter to increment the primary voltage to maximum. The drive current that flows in primary coil 101 is measured by A/D converter 121. Processor 310 then stores the value of quiescent drive current for each step of primary voltage; quiescent power being measured when no card is inserted in the reader/writer unit.

When the card trips the "card fully inserted" sensor, a measurement of maximum current flow in primary coil 101 is made. Processor 310 then compares this current flow with the stored value of current flow in the primary coil without the card inserted. If the difference is greater than a predetermined threshold, then the card is considered to be a PDC and a clamp is activated to hold the PDC in place. The predetermined threshold is a variable, stored in memory, that can be assigned any value.

Before clamping the PDC, processor 310 transmits one more pulse to counter 321 which rolls it over to zero and sets the primary voltage to minimum. After the card is clamped, processor 310 measures the active current ($I_{a,n}$) flowing in the primary coil. The value of quiescent drive current ($I_{q,n}$) for that value of primary voltage is recalled from memory and subtracted from the value obtained with the card clamped. This change in current is multiplied by the primary voltage and by a correction factor, whose values are stored in ROM, to determine the power being delivered to the PDC. If the calculated card power is below a predetermined threshold (200 mW for example), then the processor increments the primary voltage, measures the drive current, repeats the calculations, and again checks for proper level in the card. Once the power being drawn by the card exceeds the predetermined threshold, processor 310 holds the primary voltage at that value until the card is removed; thereafter, processor 310 re-measures and stores the quiescent drive current at all primary voltage levels.

Counter 321 accepts pulses from processor 310 over lines 406 to generate a parallel binary output signal on lines 407. An acceptable device is a 4-bit binary counter, such as the 74LS93, that generates sixteen different states. Quad comparator 322 compares binary signals present on lines 407 to reference voltages on lines 408 to drive four "open collector" transistor circuits at its output. These output signals generally operate as switches between resistors 323-326 and ground. A suitable device is the LM339 which is available from a number of manufacturers. A sequence of sixteen different voltages are thus presented to the inverting input of amplifier 330 and compared with a reference voltage present on its non-inverting input. The reference voltage is formed by a well-known configuration comprising series dropping resistor 501, Zener diode 502, and filtering capacitor 503. A value of 1.235 volts is used in the preferred embodiment. The various voltage levels emanating from amplifier 330 ultimately control primary voltage $V_p$ on lead 409 via pass transistor 335. In the preferred embodiment, the regulator is set to step from 6.75 to 10.5 v in equal increments. Resistor 328 provides negative feedback to amplifier 330 and maintains bias stability. Since primary voltage $V_p$ is supplied to the preamplifier as well as the power amplifier, the effect of variations in $V_p$ are multiplied. Capacitor 337 provides filtering for $V_p$.

Figure 3:
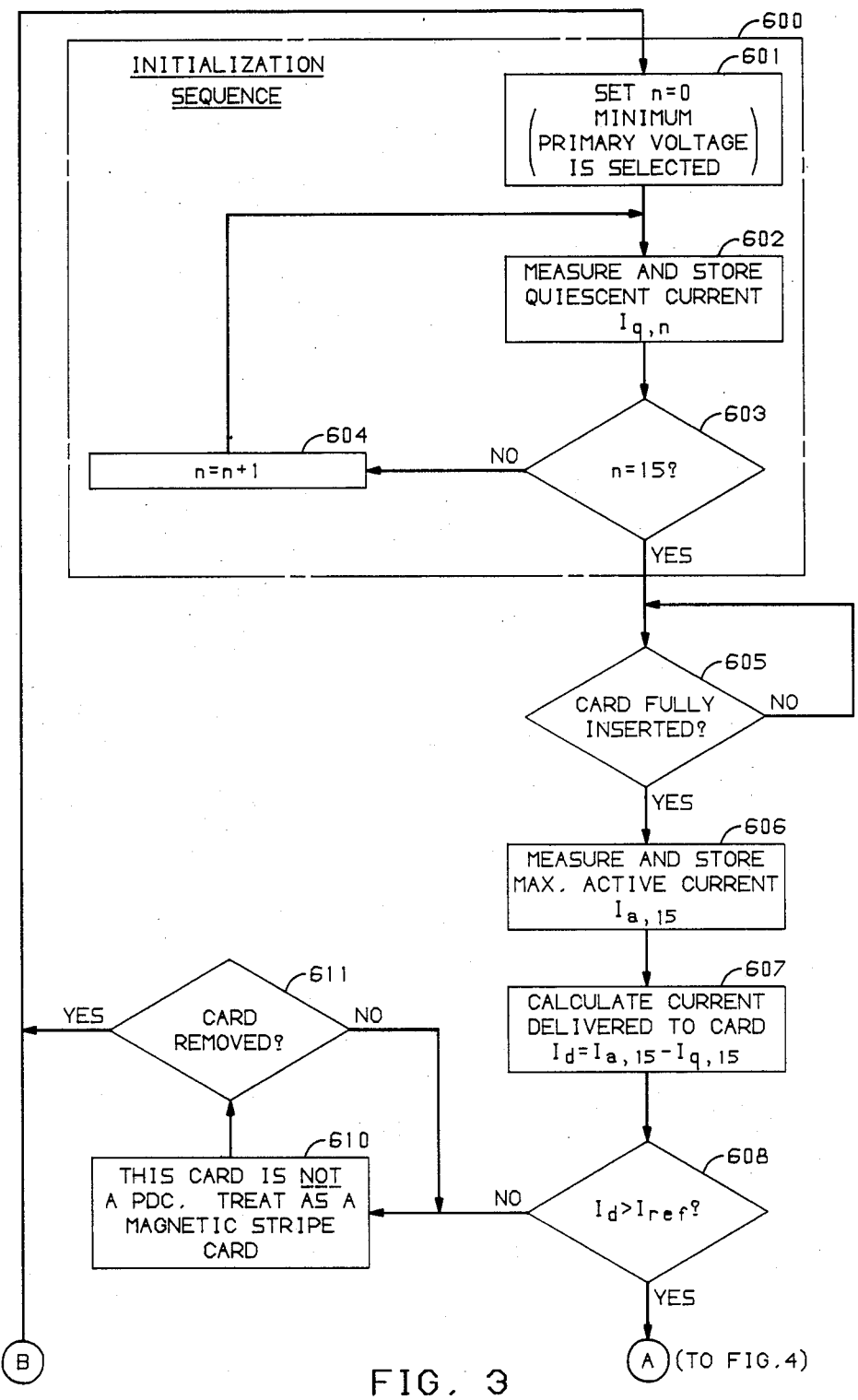
FIGS. 3 and 4 depict a flow chart that illustrates the particular operations performed by a microprocessor to implement the invention.
Figure 4:
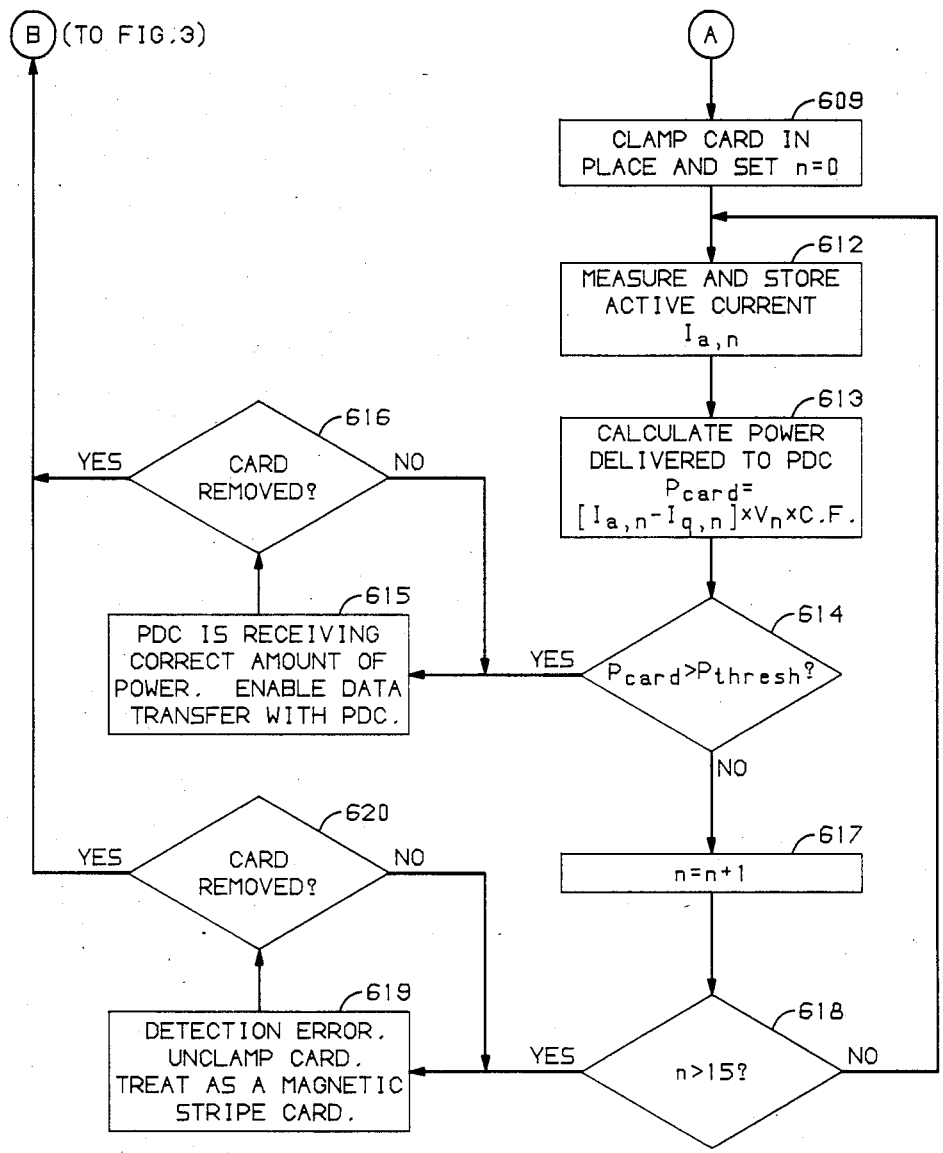

Referring now to the flow chart of FIGS. 3 and 4, steps are set forth that provide the basis for a simple computer program to perform all necessary tasks of processor 310 in controlling power delivered to the PDC in accordance with the invention. Initialization sequence 600 is desi9ned to establish a table of quiescent currents that flow in primary coil 101 when the PDC is not inserted in the reader/writer unit.

Step 601 sets n=0. This value of n is thereafter used by the 4-bit binary counter 321 to produce parallel binary digits "0000" at its output and ultimately provide the minimum primary voltage level—previously selected to be 6.75 volts in the preferred embodiment. Step 602 is the current measurement step in which A/D converter 121 provides a measure of the quiescent current flow associated with a particular value of n and is designated $I_{q,n}$.

Steps 603 and 604 set up a loop whereby 16 total values of quiescent current ($I_{q,0} \ldots I_{q,15}$) are measured and stored in a RAM.

Once a card is fully inserted, as indicated by a sensor on the reader/writer unit, a maximum active current is measured (i.e., the current that flows in primary coil 101 when $V_p$ is at its maximum level). Steps 605 and 606 perform this task. Step 607 calculates the current delivered to the card ($I_d$) as the difference between the maximum active current ($I_{a,15}$) and the maximum quiescent current ($I_{q,15}$). If this delivered current ($I_d$) exceeds reference current ($I_{ref}$), stored in memory, then it is assumed that the inserted card is a PDC; otherwise, a magnetic stripe card (that does not draw current) is assumed. Step 608 defines the measurement, and steps 610, 611 are self explanatory.

Step 609 is invoked when it is determined that the inserted card is a PDC—based on the delivered current calculation. The reader/writer unit may be equipped with a solenoid that clamps the PDC in place. Step 609 causes this to occur and simultaneously sets n=0 so that active current measurements for various primary voltages, can be commenced. Step 612 measures and stores the value of drive current ($I_{a,n}$) that flows in primary coil 101 for each value of n.

Step 613 calculates the power that is actually delivered to the PDC, for each new value of n, as the product of the difference currents indicated and a voltage $V_n$, stored in ROM. This product is then multiplied by a correction factor C.F. that is experimentally determined, stored in memory, and used to achieve correspondence between mathematical calculations and actual power measurements. The correction factor is a system constant that accounts for inherent measurement inaccuracies, flux leakage, etc.

When the power delivered to the PDC exceeds a predetermined threshold, stored in ROM, steps 615–616 provide an indication that data transfer between the reader/writer unit and the PDC may commence until the card is removed. If, however, the power delivered to the PDC is less than the predetermined threshold, step 617 increases the value of n, hence the primary voltage, and repeats the measurements of steps 612 and 613.

In the event that the power being delivered to the PDC is still less than the predetermined threshold after the maximum primary voltage is applied, steps 618 and 619 provide a default state whereby a magnetic stripe card is assumed. Normally, step 610 would have detected this condition.

When the card is removed, initialization sequence 600 is repeated to accommodate any drift in quiescent currents from day to day due to equipment wear, temperature variation, and unforeseen changes.

The above-described invention thus provides a method and apparatus for delivering a predetermined amount of power to a PDC. Advantageously, power regulation is accomplished within the card reader/writer unit so that regulator circuits and their associated power dissipation are eliminated from the PDC itself. As an added advantage, monitoring the amount of power transferred provides an ability to distinguish between various types of cards (e.g., PDC or conventional credit cards). This is useful in two ways: (i) it provides an ability to be compatible with conventional credit cards and (ii) it provides a means for distinguishing among future "smart cards."

Although power regulation is well known, the present invention provides a unique way in which to achieve it across a contactless interface; and while a specific embodiment is disclosed, it is understood that various modifications are possible within the spirit and scope of the invention. One modification being the elimination of quiescent current measurements each time a card is removed from the reader/writer unit. Instead, estimates of quiescent current are stored in memory that have been selected as representative of the particular reader/writer unit design. Another modification being the elimination of the microprocessor and digital memory. Instead, an analog feedback circuit, responsive to current flow in the primary coil, is used to control the variable voltage source. System parameters that are expected to exhibit minimum variation over the lifetime of the reader/writer unit, such as quiescent currents, are accommodated by adjustable components in the feedback circuit that are fixed at the time of manufacture.

What is claimed is:

1. In a receptor for a computerized transaction card containing microcomputer means, a power transfer coil, and a power transfer ferromagnetic member adapted, when said card is in said receptor, to flux link said coil with a transformer primary means in said receptor for transfer of energy from said receptor to said microcomputer means to provide therefor both operating power and a clock signal transmitted to said coil from said receptor, an improvement comprising:

a power amplification circuit adapted to drive the transformed primary means in response to an oscillator signal of predetermined frequency, the transformer primary means being connected to a variable voltage source;

means for measuring current flow in the transformer primary and for providing an output signal ($I_a$) representing an averaged magnitude of same; said microcomputer means being responsve to values of $P_{thresh}$, $I_q$, $V_n$ and C.F., stored in memory means, for performing the calculations;

$$P_{card} = (I_a - I_q) \times V_n \times C.F.$$

where:
$I_q$ = quiescent current flow in the transformer primary
$V_n$ = magnitude of voltage source
C.F. = correction factor
$P_{thresh}$ = threshold power level for the transaction card and increasing said variable voltage source until $P_{card}$ exceeds $P_{thresh}$.

2. A method for magnetically coupling a threshold amount of power across a dielectric interface from a primary coil in a station apparatus to a secondary coil embedded in a movable electronic transaction card, the primary coil being a circuit element in a power amplifier connected to a variable voltage source; comprising the steps of:

i. storing a predetermined value of quiescent current flow ($I_{q,n}$) in the primary coil at each of n voltage source levels;

ii. measuring the magnitude of current flow ($I_{a,n}$) in the primary coil at a particular voltge source level ($V_n$);

iii. calculating the quantity:

$$P_{card} = [I_{an} - I_{q,n}] \times V_n \times K$$

where: K is a predetermined scaling factor iv. terminating the process when $P_{card}$ exceeds the threshold amount of power; and v. increasing the voltage source level and repeating the steps starting at step ii.

3. The method of claim 2 wherein the station apparatus includes means for detecting the removal of the electronic transaction card from the station apparatus and, in response thereto, further includes the steps of:

measuring the magnitude of current flow in the primary coil at each of n values of voltage source level; and replacing the stored values of ($I_{q,n}$) with the measured magnitudes of current flow each time the electronic transaction card is removed from the station apparatus.

4. Improved apparatus for supplying an alternating current signal to a portable electronic transaction card wherein the apparatus includes a first coil for coupling the alternating current signal to a second coil located on the card, and further includes a sensor that provides first and second sensor voltages in response to the presence and abence of the card in the apparatus, the improvement comprising:

a first semiconductor device, interconnected to a variable voltage source through the first coil, for amplifying the alternating current signal;

means responsive to the current flowing through the first coil, for providing a digital signal reflecting the magnitude of said flowing current; and microprocessor means, including memory and stored instructions, responsive to the digital signal representing the magnitude of the flowing current and responsive to the sensor voltges, for controlling the magnitude of the variable voltage source.

5. The apparatus of claim 4, further comprising a second semiconductor device interconnected to the variable voltage source through the first coil, said first and second semiconductor devices forming a push-pull, class B amplifier circuit with the variable voltage source connected to a center tap of the first coil between said first and second semiconductor devices.

6. The apparatus of claim 4 wherein the alternating current signal is a periodic signal whose frequency is an integer multiple of a timing signal used in the portable electronic transaction card, whereby power and clock are simultaneously delivered to the card.

7. Apparatus for magnetically coupling an AC power signal from a primary coil to a movable secondary coil across a dielectric interface, the primary coil being connected to a voltage source and driven by an amplifier, the apparatus including means for sensing when the movable secondary coil is in close association with the apparatus, the apparatus further including:

means for determining the difference in power delivered to the primary coil, between the condition that the second coil is in close association with the apparatus and the condition that it is not; and means for varying the magnitude of the AC power signal in accordance with the difference in power.

8. A power transfer arrangement for magnetically coupling a predetermined amount of electrical power from an amplifier to a load impedance across a contactless interface, said amplifier including a primary coil connected to a variable voltage source, the arrangement comprising:

means for detecting the condition that the load impedance is in close physical proximity to the contactless interface and for providing an indication of same;

means for determining differential current flow through the primary coil between the condition that the load impedance is in close physical proximity to the contactless interface and the condition that it is not;

means responsive to said differential current and to the magnitude of the voltage source for determining the amount of power being delivered to the load impedance; and means for increasing the magnitude of the voltage source during the condition that the load impdeance is in close physical proximity to the contactless interface until the delivered power is substantially equal to said predetermined amount of electrical power.

9. The power transfer arrangement of claim 8 further comprising:

means for measuring the amount of current flow through the primary coil at various magnitudes of the voltage source during the condition that the load impedance is not in close physical proximity with the contactless interface;

memory means for storing said measured amounts of current flow at each of the magnitudes of the voltage source; and means responsive to the removal of the load impedance from close physical proximity with the contactless interface, for repeating the measurement of current flow through the primary coil at the various voltage source magnitudes.

10. Apparatus for magnetically coupling AC power from a primary coil to a movable secondary coil across a dielectric interface, the primary coil being connected to a voltage source and driven by an amplifier, the apparatus including means for sensing when the movable secondary coil is in close association with the apparatus, the apparatus further including:

means for varying the magnitude of the voltage source connected to the primary coil;

means for measuring active current flowing in the primary coil at various magnitudes of the voltage source when the secondary coil is in close association with the apparatus;

means for measuring quiescent current flowing in the primary coil at said various magnitudes of the voltage source when the secondary coil is not in close association with the apparatus;

means responsive to the difference between the measured active and quiescent currents at said various magnitudes of the voltage source for calculating delivered power; and means for increasing the magnitude of the voltage source when the secondary coil is in close association with the apparatus until the delivered exceeds a predetermined threshold.

11. The apparatus of claim 10 further including means for commencing the measurement of quiescent current each time the secondary coil is removed from close association with the apparatus.

12. The apparatus of claim 10 wherein the magnitude of the voltage source is increased by predetermined discrete steps, the apparatus further including:

analog-to-digital converter means for converting the measured active and quiescent currents into ordered sequences of binary digits at each of said discrete voltage steps; and memory means for storing the ordered sequences of binary digits.

* * * * *